United States Patent

Blomgren, Sr. et al.

[11] 3,710,837
[45] Jan. 16, 1973

[54] TIRE CONSTRICTOR

[75] Inventors: Oscar C. Blomgren, Sr.; Oscar C. Blomgren, Jr., both of Lake Bluff, Ill.

[73] Assignee: Tuxco Corporation, North Chicago, Ill.

[22] Filed: Feb. 19, 1971

[21] Appl. No.: 116,910

[52] U.S. Cl. ................................. 157/1.21
[51] Int. Cl. ................................. B60c 25/12
[58] Field of Search ...... 157/1.21; 269/130, 131, 132

[56] References Cited

UNITED STATES PATENTS

| 3,578,059 | 5/1971 | Uhen | 157/1.21 |
| 2,871,929 | 2/1959 | Butler et al. | 157/1.21 |
| 2,818,913 | 1/1958 | Twiford | 157/1.21 |
| 3,334,864 | 8/1967 | Scott et al. | 157/1.21 |
| 3,343,583 | 9/1967 | Plunk | 157/1.21 |

*Primary Examiner*—Granville Y. Custer, Jr.
*Attorney*—Fred S. Lockwood et al.

[57] ABSTRACT

A device for constricting the diameter of a tubeless tire to facilitate the mounting on a wheel which includes a fluid powered ram having a body and piston extendible therefrom, a pump for driving the ram, and a flexible strap for circumventing the tread surface of the tire, wherein the strap is attached at both ends to the ram and shortened in length by the ram to constrict the tire.

12 Claims, 12 Drawing Figures

PATENTED JAN 16 1972

Inventors
Oscar C. Blomgren, Sr.
Oscar C. Blomgren, Jr.

By Kinzer, Dorn & Zickert
Attorneys

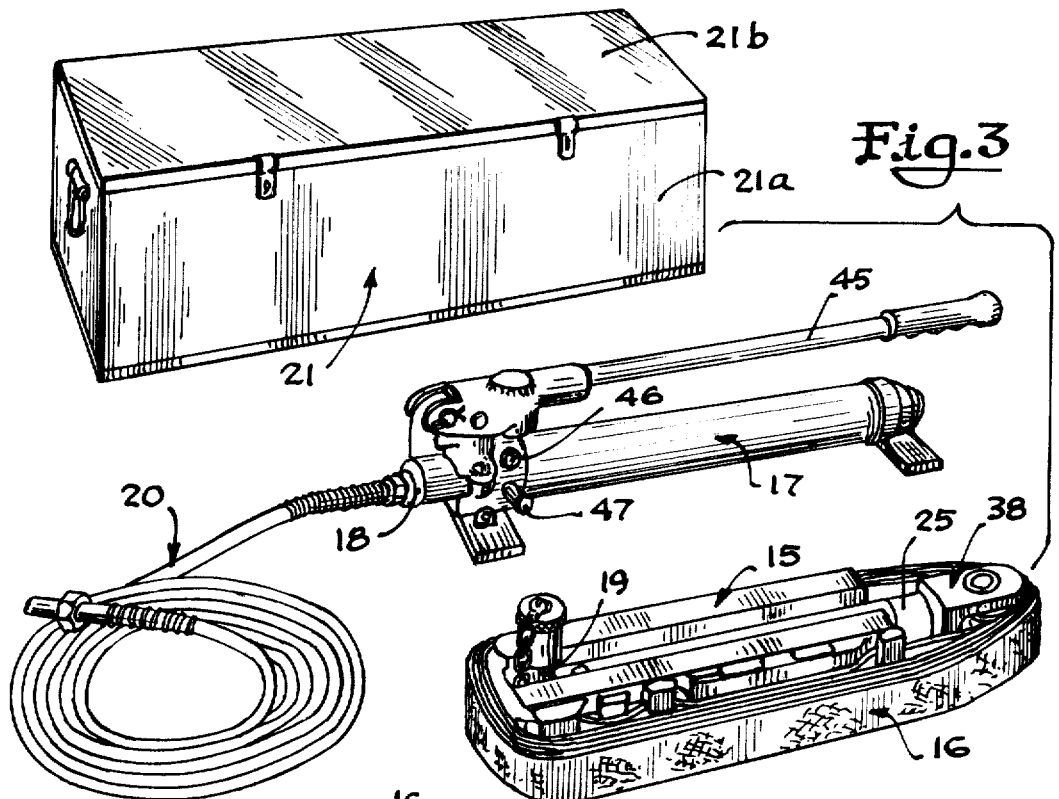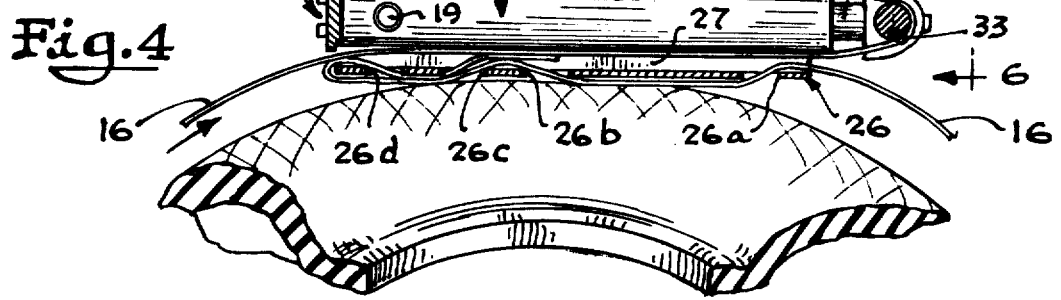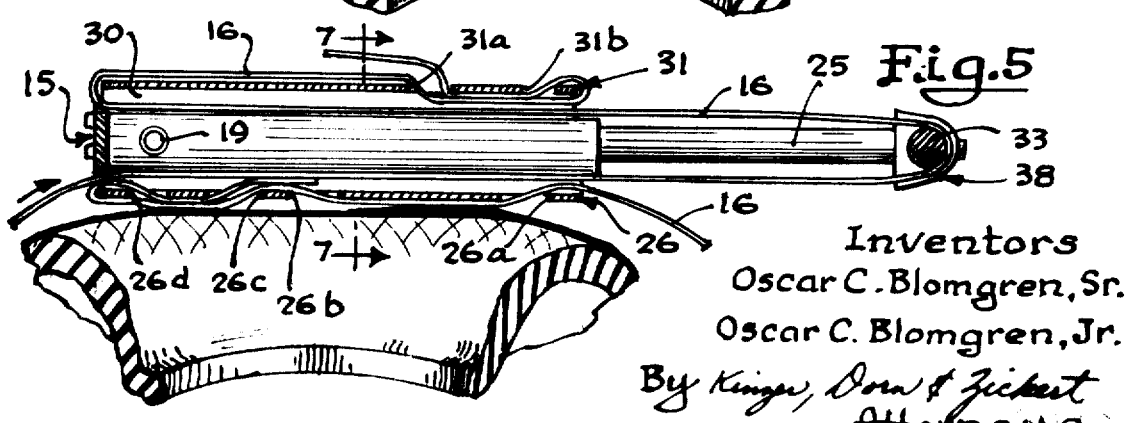

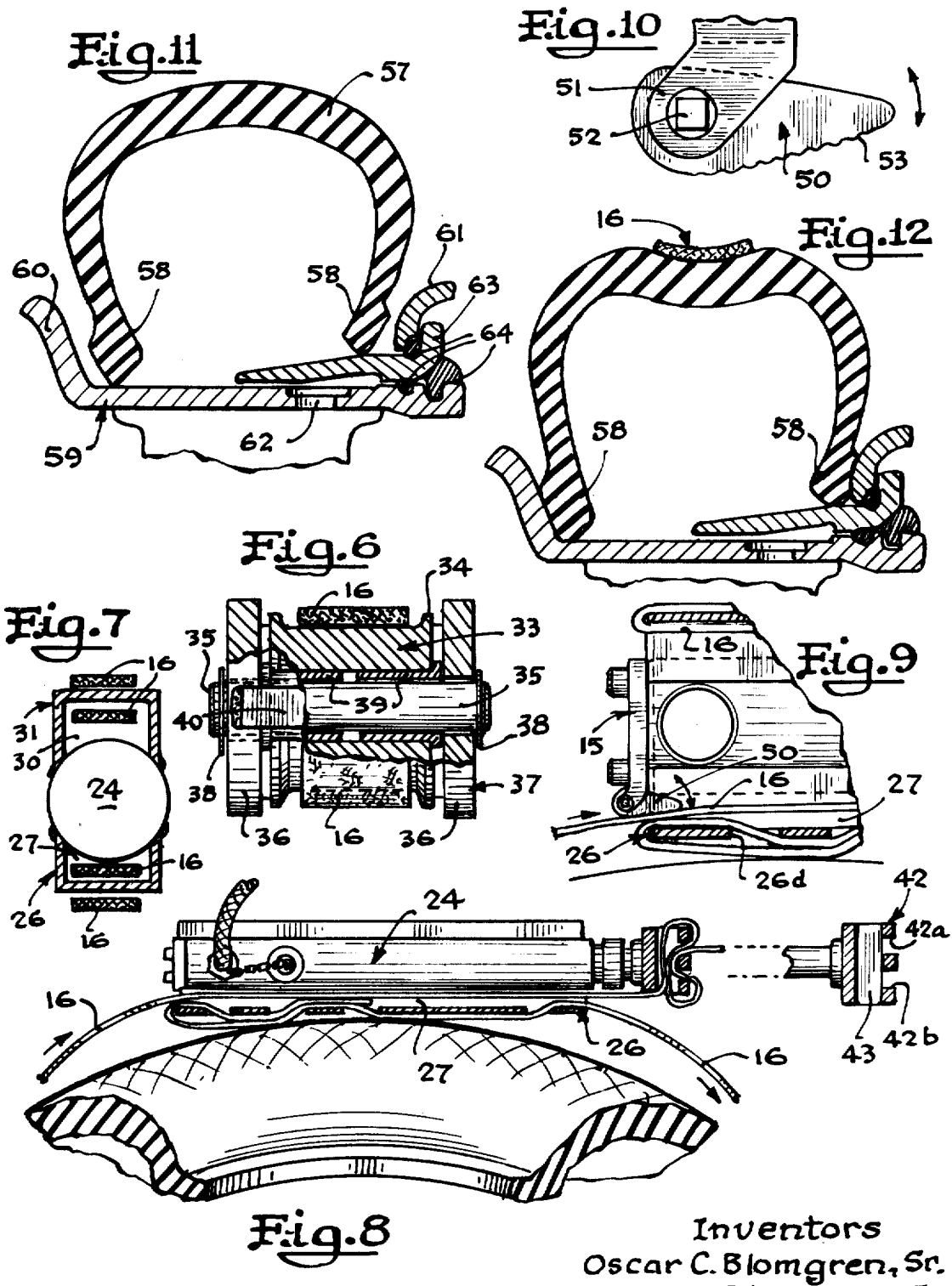

TIRE CONSTRICTOR

This invention relates in general to a device for mounting tubeless tires on wheels, and more particularly to a device for constricting the tube diameter to spread the beads into contact with the rims, and thereby permit inflation and still more particularly to a tire constrictor including a flexible strap and a fluid powered ram for squeezing the tire along a central plane and spreading the beads.

The tire constrictor of the invention is primarily useful for mounting large construction equipment tires that may be as much as 9 foot in diameter and 3 foot in width, and have as many as 28 or more plys. Such tires are usually tubeless, and because of their large size, are extremely heavy and difficult to handle. Moreover, their construction renders them extremely stiff and relatively inflexible. Normally, such large tires are mountable on wheels having one fixed rim and one removable rim, wherein the removable rim is detached to allow the tire to be first placed on the wheel. The removable rim is then reattached. The beads of the tire when it is first slipped on the wheel are not in contact with the wheel rims, and therefore since the tire is tubeless, it cannot be inflated. The beads must first be forced into contact or in engagement with both rims before the tire can be inflated. A number of tire constrictors and methods have been heretofore used, all of which have encountered many problems.

One heretofore known method of mounting such large tubeless tires involves the application of a steel strap around the tire and tread which is installed at the manufacturing facility of the tire, and which constricts the tread diameter to spread the side walls and beads so that they will contact the rims when the tire is initially placed on the wheel with the rims in place. The strap is removed after the tire is partially inflated and sealing is established between the rims and beads.

Many tires are not pre-constricted by a strap of the type mentioned in the preceding paragraph, and when tires are re-capped, the mounting problem is one that must be overcome, and which has been heretofore handled by a number of methods and devices.

One such heretofore used device includes a chain and toggle device, wherein the chain wraps around the tread diameter and by operating the toggle device, tread diameter is constricted to force the beads apart. It has been found that this device is dangerous, since the chain is subjected to considerable strain as the tire is inflated, and on occasion the chain will break and cause injury to anyone nearby.

Heavy steel rings have been heretofore used to constrict such tires by the use of a hydraulic ram with the steel ring, but a different diameter ring is needed for tires of different diameters, wherein storage and handling problems of the steel rings, especially when needed in the field, presents a rather difficult problem.

Another method heretofore used includes the application of a well lubricated rubber doughnut positioned between one bead and a wheel rim to seal the gap wherein the other bead is forced against the other rim. As the tire is inflated, the bead forces the doughnut out. The doughnut can be used again if it is not damaged in the process, but the lubrication aspect provides a messy procedure.

The air-explosion method has also been used heretofore which depends upon a large opening provided in the wheel of the vehicle to which can be attached a large hose from a huge air compressor capable of instantaneously releasing about 600 cu ft. of air compressed to about 150 psi, wherein this air supply is instantly released within the tire to effectively cause an explosion that bends the beads against the rims and traps a sufficient amount of air to inflate the tire. This method is extremely dangerous, since the air must be turned off instantly when the beads seal, or the tire will explode with such force as to severely injure, if not kill, anyone in the proximity. Further, there are very few compressors of sufficient capacity capable of producing a sufficient air supply to carry out this method.

The tire constrictor of the present invention overcomes the problems heretofore encountered in the mounting of large tubeless tires by providing a device that is lightweight and compact so that it may be easily transported and stored, and which will adjust to all sizes of tires, and which will maintain not more than a set pressure on the tire tread diameter which is completely safe to the operator and all personnel nearby.

The invention includes a fluid powered ram, a hand operated pump for driving the ram, and a flexible strap fixed to the ram and adapted to circumvent a tire. The flexible strap is connected to the ram so that upon powering of the ram, the strap will decrease its effective size relative to the ram and constrict the tire diameter to spread the beads into engagement with the rims of the wheel. The device operates to provide an even distribution of force around the circumference of the tire. Means is provided to prevent the fluid pressure in the ram to exceed a level that would break the strap and cause an accident.

It is therefore an object of the present invention to provide an improved tire constrictor that is especially designed to constrict the diameter of large construction equipment tires, and thereby facilitate their mounting on wheels.

A further object of the present invention is in the provision of a tire constrictor that is lightweight and compact, thereby facilitating its use, storage, and especially enhancing its usefulness for field service.

A still further object of this invention is to provide a tire constrictor that is extremely rugged and capable of constricting the diameter of a tire by applying all force tangentially to the tire casing circumference, and which includes a fluid powered ram operable to shorten the length of a flexible strap wherein the force vectors are in the same axis as the ram to eliminate any side deflection.

Another object of this invention is in the provision of a tire constrictor that may be easily adjusted to tires of different sizes, and which includes a fluid powered ram for shortening the length of a strap, wherein the ram includes a piston having a roller at the head end capable of guiding the strap thereover and enabling the strap to be connected to the ram so that strap take-up equals double the stroke of the ram.

Other objects, features and advantages of the invention will be apparent from the following detailed disclosure, taken in conjunction with the accompanying sheets of drawings, wherein like reference numerals refer to like parts, in which:

FIG. 3 is a composite perspective view of the tire constrictor and carrying case with the hydraulic ram and flexible strap wrapped therearound and illustrated adjacent the hydraulic pump, both of which can be easily placed in the carrying case and transported from place to place;

FIG. 4 is an enlarged view of the hydraulic ram as positioned on a tire with some parts in section to illustrate the manner in which the flexible strap is connected to the ram, and showing the piston of the ram in fully contracted position;

FIG. 5 is a view similar to FIG. 4 but illustrating the ram in fully protracted position;

FIG. 6 is an enlarged end view of the roller end of the ram piston with some parts partly broken away and other parts in section;

FIG. 7 is a sectional view taken substantially along line 7—7 of FIG. 5, to illustrate the pathways of the flexible strap;

FIG. 8 is a view similar to FIG. 4, but illustrating another embodiment of the invention wherein one end of the flexible strap is connected directly to the head of the ram piston and illustrating the head with and without the strap;

FIG. 9 is a detailed view illustrating a clamp for permitting greater take up of the flexible strap, where take up in addition to that possible with the ram piston can be accomplished;

FIG. 10 is an enlarged view of the clamp as removed from the ram to illustrate details;

FIG. 11 is a transverse sectional view taken through a typical rim and tire assembly and illustrating the beads in spaced relation from the wheel rims; and FIG. 12 is a view similar to FIG. 11 but illustrating the manner in which the tire constrictor constricts the tire and spreads the beads into contact with the rims.

The tire constrictor of the invention applies force evenly to the entire tread circumference of a tire by having a flexible strap in engagement with nearly all of the tread circumference and associated with a ram that is positioned against the tread circumference during operation. Accordingly, the force applied is tangential to the tire casing circumference. Inasmuch as the ram is positioned adjacent the tire circumference, the force vectors produced in operating the ram are in the same axis as the ram piston, thereby eliminating any side deflection of the piston and giving great mechanical integrity to the device. The ram is operated by a suitable pump, manual or otherwise, which is connected to the ram by a flexible hose and which may be operated remote from the wheel in order to further safeguard against accidental injury at the wheel that may be caused due to failure of parts. The flexible strap is adjustably connected to the ram so as to facilitate use of the constrictor on any tire circumference. A pressure relief valve is provided on the ram or the pump to prevent exceeding the strap capacity during operation of the constrictor.

Figure 1:
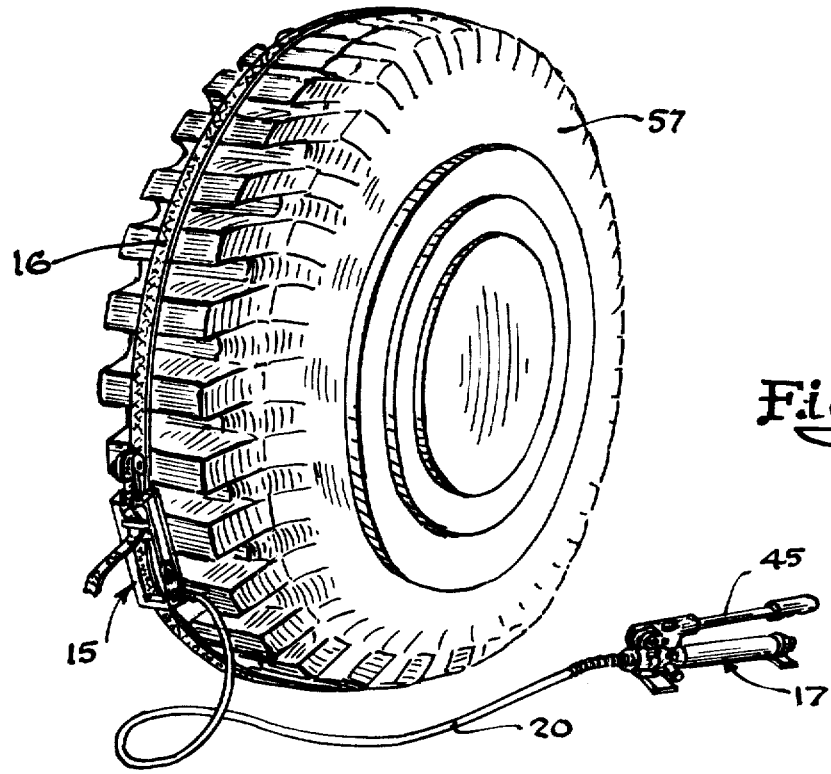
FIG. 1 is a perspective view of a tire and ram assembly, and illustrating the tire constrictor of the invention as arranged for constricting the tire to spread the beads into contact with the wheel rims.
Figure 2:
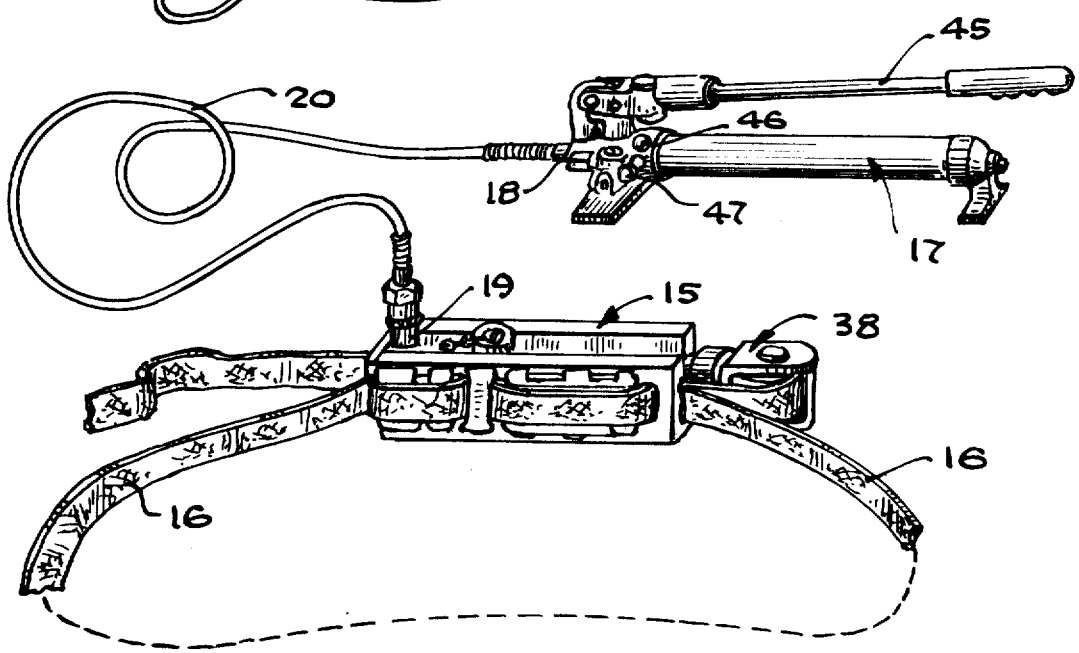
FIG. 2 is an enlarged view of the tire constrictor removed from a tire and illustrating details of construction.

Referring to the drawings, and particularly to FIGS. 1 and 2, the tire constrictor of the invention includes generally a hydraulic ram 15, a flexible strap 16 associated with the ram, and a hydraulic pump 17. While the invention will be described as employing a hydraulic pump and ram, it should be appreciated that a pneumatic pump or ram could be used if so desired. The hydraulic pump 17 includes a pressure outlet 18 connectable to a fitting 19 on the ram 15 by a flexible hose 20. Accordingly, the pump 17 may be located remote from the ram in a suitable position for operation and away from the wheel.

The compactness and transportability of the tire constrictor is illustrated in FIG. 3, wherein the flexible strap 16 is wrapped around the ram 15, and together with the pump 17 and the hose 20, may be placed within a carrying case 21. Thus, the tire constrictor is a self-contained unit not depending upon any outside power source and it may be carried along with heavy equipment or stored very easily for ready use when needed.

The ram 15 includes a body 24 having a piston 25 reciprocal therein in response to the fluid pressure developed by the pump 17. The flexible strap 16 is secured to the ram body so that protraction and contraction of the ram will cause take-up of the strap. One end of the strap is connected directly to the side of the ram body 24 that faces the tread circumference when it is positioned on a tire to constrict same. The other end of the strap is connected to the other side of the ram body and arranged in connection with the ram piston and the ram body to enable take-up of the strap.

Channel iron or the equivalent is welded or otherwise attached to the opposite sides of the ram for purposes of securing the ends of the flexible strap in place and to guide strap movement. Slots are provided in the channel irons to enable anchoring of the strap ends. At the side of the ram that would be positioned against the tire circumference, a channel iron 26 defines with the ram body a pathway 27, and includes spaced slots 26a, 26b, 26c and 26d. Connecting the strap to the channel iron 26 is accomplished by threading the the strap into the pathway 27, downwardly through the slot 26a against the outer side of the channel iron, then upwardly through the slot 26b into the pathway 27, downwardly through the slot 26c to the exterior of the channel iron, along the exterior of the channel iron and around the end of the channel iron back into the pathway 27, downwardly through the slot 26d between the strap and channel iron and upwardly through slot 26c into the pathway 27. This firmly anchors the strap to one side of the ram and it should be appreciated that the strap may be adjustably fixed to the ram at this side.

The other end of the strap 16 is threaded through the pathway 27 of the channel iron 26, over the head of the ram piston 25, through a pathway 30 defined by a channel iron 31 on the side of the ram body opposite the channel iron 26, around the end of the channel iron 31 and over the outside of the channel iron back toward the ram head down through a slot 31a, back through the pathway 30 and over the other end of the channel iron, around the outside of the channel iron and back through a second slot 31b down into the pathway 30, and out the slot 31a. Strap slack is taken up at the channel iron 31 when initially positioning the ram on the circumference of the tire tread, so that with the ram piston fully retracted, the strap is snugly fitted and adjusted to the tread circumference. Thereafter, extension or protraction of the ram piston 25 causes constricting of the tire which spreads the side walls and beads.

In order to eliminate friction between the strap 16 and ram piston head, a roller 33 is mounted on the ram piston head, over which the strap 16 is trained. As seen particularly in FIG. 6, the roller 33 includes spaced radial flanges 34 centering the strap on the roller during take-up to eliminate binding. The roller is mounted on a pin 35 which is supported by spaced legs 36 of a U-shaped bracket 37 carried on the outer end of ram piston 25. Split retaining rings 38 fit in grooves on the pin 35 to hold it in place. The roller is provided with an axial bore which receives a pair of oilite bushings 39 that provide bearing support for the roller on pin 35. The bushings are flanged at their outer ends to keep the roller from engaging the legs 36. A keeper bar 40 extends across the nose of the bracket 38 and is suitably fastened thereto to prevent the strap from becoming disengaged from the roller 33. Accordingly, the strap will be maintained in the axis of the ram piston.

While the embodiment of FIGS. 1-7 constitutes the preferred embodiment, it should be appreciated that the strap could be connected directly to the head of the ram piston, as illustrated in the embodiment of FIG. 8. The strap take-up with the embodiment of FIGS. 1-7 is effectively double that of the embodiment of FIG. 8 for a given amount of ram movement. In the embodiment of FIG. 8, the strap 16 is again connected to the channel iron 26 on one side of the ram body 24 in the same manner as in the first embodiment and shown in FIGS. 4 and 5. Further, the take-up end of the strap 16 is threaded through the pathway of the channel iron 26 to the ram piston head, but in this embodiment, the ram piston head is provided with a channel iron 42 defining a pathway 43, wherein the strap is threaded first through the pathway 43 around the upper end of the channel iron, over the end and along the outside inwardly to the pathway 43 through a first slot 42a, back through the pathway and out the other end of the pathway, over the lower end of the channel iron, around the exterior of the channel iron and into the pathway 43 through a second slot 42b, and back out of the pathway through the slot 42a. This threading of the strap effectively locks it to the channel iron 42 at the head end of the ram piston, and may serve to adjust the length to fit tires of various sizes.

The hydraulic pump 17 is of a conventional type and includes a pump handle 45 operable to extend the ram 24. A suitable valve 46 is provided to release the pressure of the hydraulic circuit when it is desired to retract the ram piston, and to condition the circuit for applying the pressurized fluid to the ram to extend the ram piston and constrict a tire. The strap 16 is constructed of a suitable material, such as a plastic material. More particularly, the strap may be made of nylon, dacron or polypropylene. It could also be made of steel mesh if desired.

In order to assure the strap capacity is not exceeded, especially when the tire begins to expand as it is inflated, a pressure relief by-pass valve 47 is provided on the pump, FIG. 2, which will operate to relieve hydraulic pressure in the event that the hydraulic pressure exceeds a given value.

The tire constrictor may be compactly arranged and easily placed in a carrying case such as that illustrated in FIG. 3. The case 21 includes a suitable rectangularly shaped body 21a with a cover 21b. For storage, the flexible hose 20 may be disconnected from either or both the ram 15 and the pump 17. As illustrated, the hose is disconnected from the ram. The hose may then be coiled and arranged with the pump in the carrying case 21. The strap 16 may be wrapped neatly around the ram as illustrated and likewise placed in the carrying case. Accordingly, the tire constrictor may be easily and efficiently stored in the carrying case which further enables it to be easily transported in a vehicle if so desired, and thereby especially useful in the field.

In a tire constricting situation where it is necessary to have a greater take-up than that possible by completely extending the ram piston to obtain the necessary tire constriction, a clamping arrangement may be provided to hold the strap in a tightened position while the ram head is retracted and slack is taken up at the ram head. Such a clamping arrangement is illustrated in FIGS. 9 and 10, wherein an eccentric clamping member 50 is mounted on the ram body at the end opposite the piston head, and in association with the channel iron 26. The clamping member 50 is pivoted between a pair of opposed support arms 51 extending from the ram body, and mounted to only move upon application of a wrench force that may be applied to a shaped extension 52 for rotating the clamping member from a rest and inoperative position against the ram body to a gripping and operative position against the strap forcing it into locking engagement with the channel iron 26. The strap engaging surface 53 of the clamping member is preferably roughened to enhance the gripping action with the plastic strap. Thus, it can readily be seen that following the maximum take-up of the strap by full extension of the ram piston the clamping member 50 may be rotated into clamping relation with the strap 16 to anchor the strap to channel iron 26 against movement through pathway 27, whereupon the strap at the ram head or anchoring channel iron 31 may be tightened when the ram piston is retracted. Thereafter, release of the clamping member and extending of the ram piston will permit additional take-up of the strap and further tire constriction by further ram operation. The clamping procedure may be repeated if necessary.

The ram 15 and strap 16 may be constructed to provide any desired piston stroke and force. For example, the ram may have a 10 inch stroke and the capability of applying 10,000 pounds per square inch uniformly around the circumference of a tire. A 10 inch stroke will, in the embodiments of FIGS. 1-7, result in decreasing tire circumference up to 20 inch, or a distance twice the length of the piston stroke. Should additional take-up be necessary, the clamping arrangement of FIGS. 9 and 10 may also be employed. The force vectors of the ram are tangential to the tire circumference and in the same axis as the ram piston, thereby eliminating any side deflection of the piston. Force developed by the ram is applied evenly to the entire tread circumference of the tire. This may be further appreciated since the metal channel iron 26 on the side of the ram facing the tire circumference is spaced from the tire tread by the plastic strap which runs nearly the entire length of the channel iron against the tire tread, thereby preventing contact of the rubber tread with the metal channel iron. Accordingly, the ram will slide over the surface of the tire as the strap is tightened since the plastic strap can easily slide against the rubber surface.

Operation of the unit, while apparent from the foregoing description, merely involves placement of the ram and strap on the circumference of the tire as illustrated in FIG. 1, with all slack of the strap being taken up at the channel iron 31 with the ram piston fully retracted. Thereafter, operation of the hand pump 17 causes extension of the ram and tightening of the strap to constrict the tire.

As seen in FIGS. 11 and 12, a tire 57 having beads 58 is first applied to the rim assembly 59. The rim assembly 59 includes a stationary inner rim 60 and a removable outer rim 61, with a valve hole 62. Rim retainer 63 coacts with gaskets 64 to sealingly lock the rim 61 in place. Suitable bolt and nut structures (not shown) are provided to permit removal and replacement of the rim 61 and rim retainer 63. This type of rim structure is most commonly used in connection with large tires used on heavy equipment, it not being possible to expand the beads so that they would slide over a stationary rim. Following initial placement of the tire on the wheel, as seen in FIG. 11, the beads 58 are spaced from the rim, and not therefore in sealing engagement therewith. It is not possible for the tire 57 to hold air unless the beads are in sealing engagement with the rims. The tire constrictor of the present invention therefore enables constricting the circumference of the tire to cause the sidewalls and beads 58 to move outwardly into sealing engagement with the rims, as shown in FIG. 12, and when the beads are in this position, air can be supplied to the tire to inflate same and maintain the beads in expanded position. When a sufficient amount of air is in the tire to hold the beads against the rims, the tire constrictor may be removed by releasing the pressure in the ram so that the strap loosens and can be removed from the tire circumference. Thus, the normal tire configuration, as seen in FIG. 11, must be initially constricted as shown in FIG. 12 in order to successfully mount such a tubeless tire onto a rim structure.

It will be understood that modifications and variations may be effected without departing from the scope of the novel concepts of the present invention, but it is understood that this application is to be limited only by the scope of the appended claims.

The invention is hereby claimed as follows:

1. A tire constrictor for mounting a tubeless tire on a vehicle wheel to constrict the tire diameter, and cause the beads of the tire to spread and contact the wheel rims, said constrictor comprising, a fluid ram including a body adapted to extend substantially tangential to the tire and a piston extendable therefrom, a roller on the head of the piston, a strap of flexible material in tire circumventing relation having one end attached to the ram body on the side adjacent the tire and at the end opposite said piston head and extending parallel to said body and the other end overlapping said one end and first trained over the piston head roller and then attached to the side of the body opposite the side thereof against the tire tread, and means for operating the ram.

2. A tire constrictor as defined in claim 1, wherein the strap is of plastic material and attached to the ram body so that it separates the body from the tire tread to provide a relatively frictionless engagement so that the ram will slide easily over the tire tread during constricting action.

3. A tire constrictor as defined in claim 2, and flange means on the opposite edges of the roller to guide the strap during movement over the piston.

4. A tire constrictor as defined in claim 3, and pressure relief means to limit the maximum pressure in the ram.

5. A tire constrictor as defined in claim 4, wherein said means for operating the ram includes a hand operated pump.

6. A tire constrictor as defined in claim 5, wherein means is provided for attaching one end of the strap to the ram body to permit adjusting the length of the strap to fit tires of various sizes.

7. A tire constrictor for mounting a tubeless tire on a vehicle wheel having spaced rims to constrict the outer diameter of the tire and cause the tire beads to spread and engage the wheel rims, said constrictor comprising, a hydraulic ram including a body and a piston extendable therefrom, said ram body extending substantially tangential to the tire tread and having a strap anchor plate secured to and extending along the side of the body facing the tire tread, said strap anchor plate being spaced from said body to define a channel extending along the body and parallel to the piston, a strap of flexible material secured at one end to the end of said anchor plate at the end opposite said piston head and circumventing at least 360° of the tire tread and guidably extending through said channel from the end opposite the piston head to the end adjacent the piston head, means attaching the other end of the strap to the piston head, and means for operating the ram.

8. A tire constrictor for mounting a tubeless tire on a vehicle wheel having spaced rims to constrict the outer diameter of the tire and cause the tire beads to spread and engage the wheel rims, said constrictor comprising, a hydraulic ram including a body and a piston extendable therefrom, said ram body extending substantially tangential to the tire tread and having a strap anchor plate secured to and extending along the side of the body facing the tire tread, said strap anchor plate being spaced from said body to define a channel extending along the body and parallel to the piston, a strap of flexible material secured at one end to the end of said anchor plate at the end opposite said piston head and circumventing at least 360° of the tire tread and guidably extending through said channel from the end opposite the piston head to the end adjacent the piston head, a roller on the head of the piston, a second strap anchor plate secured to and extending along the side of the body opposite the side thereof facing the tire tread, the other end of the strap being first trained over the piston head roller and then secured to said second anchor plate, and pump means for supplying pressurized fluid to the ram to extend the piston and constrict the tire.

9. A tire constrictor for mounting a tubeless tire on a vehicle wheel having spaced rims to constrict the outer diameter of the tire and cause the tire beads to spread and engage the wheel rims, said constrictor comprising, a fluid ram including a body and a piston extendible therefrom, a roller on the head of the piston, pump means for supplying pressurized fluid to the ram to extend the piston, a strap of flexible material for engaging and circumventing the tire tread, first and second means on the ram body for attaching the ends of the strap thereto and permitting one end of the strap to be trained over the roller, and each said attaching means includes a channel iron extending along the longitudinal axis of the ram body defined by an outer plate spaced from the ram body and having a plurality of strap slots coacting to anchor the strap thereto.

10. A tire constrictor as defined in claim 9, wherein the length of the strap for the tire tread can be adjusted at the attaching means.

11. A tire constrictor as defined in claim 10, wherein pressure relief means is provided in the pump to limit the maximum pressure in the ram.

12. A tire constrictor as defined in claim 11, wherein the roller includes annular flanges at its edges for guiding the strap therebetween.

* * * * *